(12) United States Patent
Shibutani

(10) Patent No.: US 7,417,667 B2
(45) Date of Patent: Aug. 26, 2008

(54) IMAGING DEVICE WITH FUNCTION TO IMAGE STILL PICTURE DURING MOVING PICTURE IMAGING

(75) Inventor: Atsushi Shibutani, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 772 days.

(21) Appl. No.: 10/807,610

(22) Filed: Mar. 24, 2004

(65) Prior Publication Data

US 2004/0189824 A1    Sep. 30, 2004

(30) Foreign Application Priority Data

Mar. 31, 2003   (JP)   ............................. 2003-096906

(51) Int. Cl.
   *H04N 5/225*   (2006.01)
(52) U.S. Cl. ............................... 348/220.1; 348/333.05
(58) Field of Classification Search .............. 348/220.1, 348/333.05
   See application file for complete search history.

(56) References Cited

U.S. PATENT DOCUMENTS

| | | | | |
|---|---|---|---|---|
| 6,023,520 | A * | 2/2000 | Nagasaka et al. | 382/107 |
| 6,606,451 | B2 * | 8/2003 | Honda et al. | 386/95 |
| 6,680,748 | B1 * | 1/2004 | Monti | 348/220.1 |
| 6,683,649 | B1 * | 1/2004 | Anderson | 348/333.05 |
| 7,064,780 | B2 * | 6/2006 | Shimizu | 348/220.1 |
| 7,145,601 | B2 * | 12/2006 | Misawa et al. | 348/333.05 |
| 2002/0154226 | A1 | 10/2002 | Gohda | |
| 2003/0052986 | A1 | 3/2003 | Matsumoto | |

FOREIGN PATENT DOCUMENTS

| | | |
|---|---|---|
| JP | 07-284058 | 10/1995 |
| JP | 10-028250 | 1/1998 |
| JP | 11-177861 | 7/1999 |
| JP | 11-213524 | 8/1999 |

(Continued)

OTHER PUBLICATIONS

European Search Report for corresponding European application No. 04290835.0-1522 lists the references above.

*Primary Examiner*—Lin Ye
*Assistant Examiner*—Gevell Selby
(74) *Attorney, Agent, or Firm*—Hogan & Hartson LLP

(57) ABSTRACT

When an imaging device records a moving picture captured as a moving picture file, a representative picture that indicates the content of the moving picture is created and embedded in the moving picture file. If no still picture is captured simultaneously during the moving picture imaging, a frame picture at the beginning of moving picture frames is used as a representative picture. When a still picture is captured simultaneously during the moving picture imaging, the still picture is used as a representative picture of the moving picture. When reproducing recorded pictures, representative pictures of still pictures and representative pictures of moving pictures may be displayed at once on a selection screen that is displayed for image selection purposes. Among the displayed representative pictures, a representative picture of a moving picture during which a still picture was simultaneously captured represents an image of a scene for which the user's interest is higher than other scenes during the moving picture imaging, and is identical to the subsequent representative image of the still picture that was captured simultaneously during the moving picture imaging.

12 Claims, 6 Drawing Sheets

FOREIGN PATENT DOCUMENTS

| | | |
|---|---|---|
| JP | 2000-138883 | 5/2000 |
| JP | 2000278641 A | 10/2000 |
| JP | 2002-290908 | 10/2002 |
| KR | 2000-0007741 | 2/2000 |
| KR | 2002-0008005 | 1/2001 |

* cited by examiner

IMAGING DEVICE WITH FUNCTION TO IMAGE STILL PICTURE DURING MOVING PICTURE IMAGING

BACKGROUND OF THE INVENTION

1. Field of the Invention

The present invention relates to an imaging device and method with function to image still picture during moving picture imaging.

2. Description of the Related Arts

Electronic cameras, such as digital still cameras and digital video cameras, may be provided with a function to image still pictures during moving picture imaging. Also, there is a technology in electronic cameras that automatically extracts as a representative image (hereinafter called "index image") a frame image of a predetermined position (beginning, end, or somewhere in-between) in moving picture or a frame image of a position where a zoom operation took place, and uses the index image to indicate to the user the content of the moving picture imaged.

SUMMARY OF THE INVENTION

In accordance with an embodiment of the present invention, an imaging device comprises an image capturing unit; a first imaging control unit that makes the image capturing unit to execute moving picture imaging; a first recording control unit that records in a memory moving picture data obtained through the moving picture imaging by the first imaging control unit; a recording instruction unit that instructs to record a still picture; a still picture acquisition unit that acquires, when recording of a still picture is instructed by the recording instruction unit during the execution of the moving picture imaging by the first imaging control unit, still picture data at the timing instructed; a second recording control unit that records in a memory the still picture data acquired by the still picture acquisition unit; and a third recording control unit that records in a memory the still picture data acquired by the still picture acquisition unit as index image data of the moving picture data recorded in the memory by the first recording control unit.

In accordance with another embodiment of the present invention, an imaging device comprises an image capturing unit; a first imaging control unit that has the image capturing unit execute moving picture imaging; a first recording control unit that records in a memory moving picture data obtained through the moving picture imaging by the first imaging control unit; a recording instruction unit that instructs to record a still picture; a still picture acquisition unit that acquires, when the recording of a still picture is instructed by the recording instruction unit during the execution of the moving picture imaging by the first imaging control unit, still picture data at the timing instructed; a second recording control unit that records in a memory the still picture data acquired by the still picture acquisition unit; a third recording control unit that records timing information that specifies the timing instructed in correlation to the moving picture data when recording of a still picture is instructed by the recording instruction unit during the execution of the moving picture imaging by the first imaging control unit; a still picture extracting unit that extracts, based on the timing information recorded in correlation to the moving picture data in the memory, from the moving picture data the still picture data at the timing instructed to record the still picture; and an index image reproduction unit that reproduces the still picture data extracted by the still picture extracting unit as index image data of the moving picture data.

In accordance with another embodiment of the present invention, an imaging device comprises an image capturing unit; a first imaging control unit that has the image capturing unit execute moving picture imaging; an imaging instruction unit that instructs still picture imaging; a second imaging control unit that has the image capturing unit execute a still picture imaging when imaging of a still picture is instructed by the imaging instruction unit during the execution of the moving picture imaging by the first imaging control unit; a recording control unit that records in a memory correlating moving picture data obtained through the moving picture imaging by the first imaging control unit and still picture data obtained through the still picture imaging by the second imaging control unit to each other; and an index image reproduction unit that reproduces the still picture data recorded in the memory in correlation to the moving picture data as index image data of the moving picture data.

In accordance with another embodiment of the present invention, an imaging device comprises image capturing means; first imaging control means for having the image capturing means execute moving picture imaging; first recording control means for recording in a memory moving picture data obtained through the moving picture imaging by the first imaging control means; recording instruction means for instructing the recording of a still picture; still picture acquisition means for acquiring, when the recording of a still picture is instructed by the recording instruction means during the execution of the moving picture imaging by the first imaging control means, still picture data at the timing instructed; second recording control means for recording in a memory the still picture data acquired by the still picture acquisition means; and third recording control means for recording in the memory the still picture data acquired by the still picture acquisition means as index image data of the moving picture data recorded in the memory by the first recording control means.

In accordance with another embodiment of the present invention, an imaging method comprises a step of having an image capturing unit execute moving picture imaging; a step of acquiring, when recording of a still picture is instructed during the execution of the moving picture imaging, still picture data at the timing instructed; a step of recording in a memory moving picture data obtained through the moving picture imaging and the still picture data acquired; and a step of recording in a memory the still picture data acquired as index image data of the moving picture data recorded in the memory.

In accordance with another embodiment of the present invention, a program executed by a computer of an imaging device, comprising a processing for having an image capturing unit execute moving picture imaging; a processing for acquiring still picture data of the timing instructed when the recording of a still picture is instructed during the execution of the moving picture imaging; a processing for recording in the memory the moving picture data obtained through the moving picture imaging and the still picture data acquired; and a processing for recording in the memory the still picture data acquired as index image data of the moving picture data recorded in the memory.

Other features and advantages of the invention will be apparent from the following detailed description, taken in conjunction with the accompanying drawings that illustrate, by way of example, various features of embodiments of the invention.

DESCRIPTION OF PREFERRED EMBODIMENTS

Figure 1:
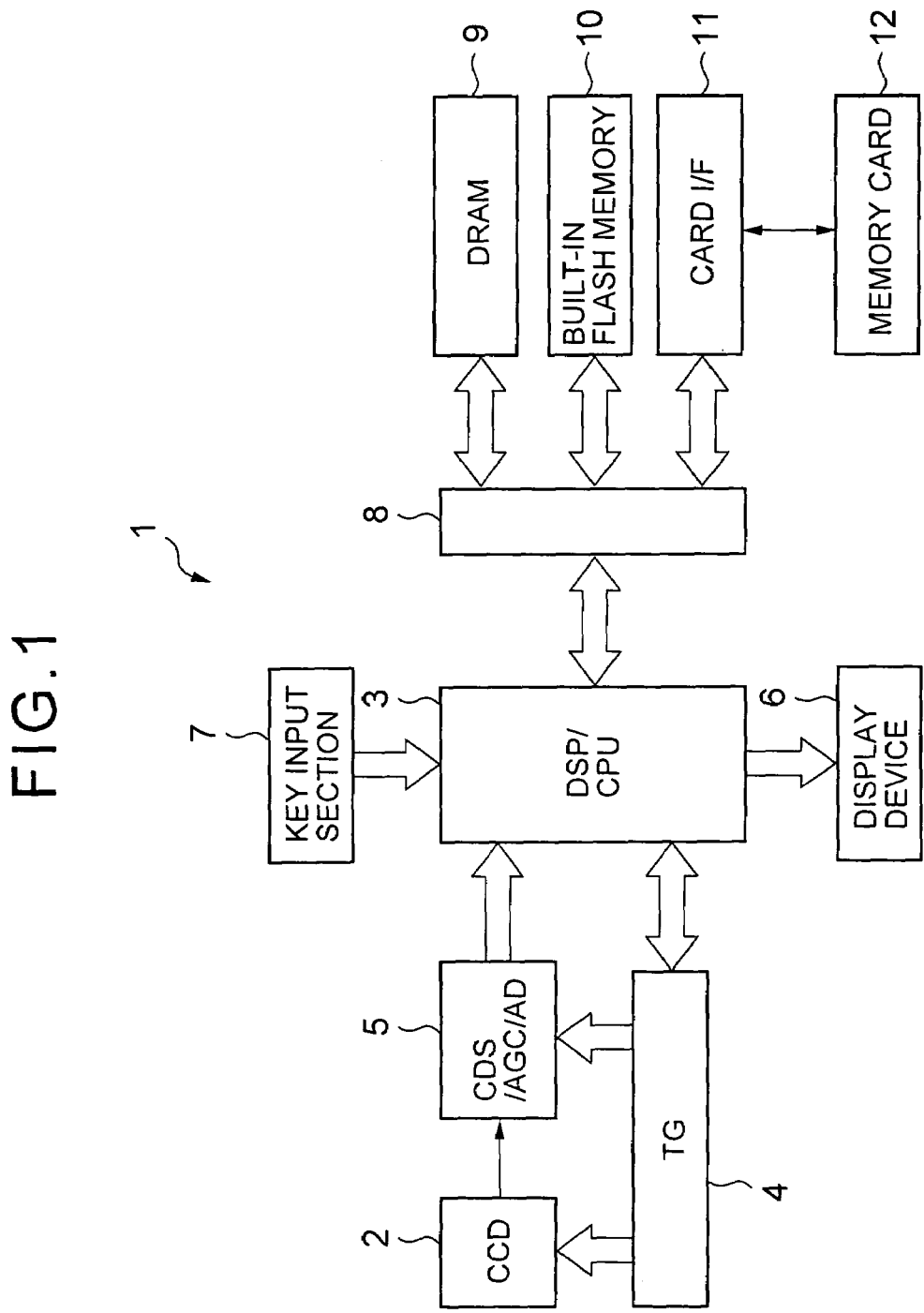
FIG. 1 shows a block diagram of an electronic still camera in accordance with a first embodiment of the present invention.

An embodiment of the present invention is described below with reference to the accompanying drawings. FIG. 1 is a block diagram of a general outline configuration of an electronic still camera 1 that has a normal still picture imaging function and a moving picture imaging function, and that can image still pictures during moving picture imaging. The electronic still camera 1 has a CCD 2 and a DSP/CPU 3. The DSP/CPU 3 is a single chip microcomputer that has various digital signal processing functions, including image data compression/decompression processing, and that controls various parts of the electronic still camera 1.

A TG (timing generator) 4 that drives the CCD 2 is connected to the DSP/CPU 3; and the TG 4 is connected to a unit circuit 5, to which analog image signals outputted from the CCD 2 are inputted based on optical pictures of subjects. The unit circuit 5 includes a CDS (correlated double sampling) circuit, which performs correlated double sampling on image signals outputted from the CCD 2 and holds the resulting signals; a gain adjustment amplifier (e.g., an automatic gain controller (AGC)) that amplifies the image signals; and an A/D converter (AD) that converts the amplified image signals into digital signals; signals that are outputted from the CCD 2 are sent to the DSP/CPU 3 as digital signals via the unit circuit 5.

A display device 6, a key input section 7, a DRAM 9, a built-in flash memory 10 and a card interface 11 are connected to the DSP/CPU 3 via an address data bus 8. The card interface 11 connects to a memory card 12, which is freely detachably mounted in a slot, not shown, of the main body of the electronic still camera 1. The memory card 12 is an image recording device according to the present invention for recording data of still pictures and moving pictures imaged.

The display device 6 includes a color LCD and its drive circuit. The display device 6 displays subject images captured by the CCD 2 as through images in the imaging standby state, and recorded images (still or moving pictures) read from the memory card 12, which is a storage memory, and decompressed when recorded images are reproduced. In a multi-reproduction mode described later, the display device 6 displays in thumbnails a list of images recorded on the memory card 12.

The key input section 7 includes a shutter button, a video-recording start/end button used for moving picture imaging, and a plurality of operation keys, including an image selection key that is used when recorded images are reproduced, a power source key and a menu key. The key input section 7 outputs to the DSP/CPU 3 key input signals that correspond to key operations by the user.

The DRAM 9 is a buffer memory for temporarily storing digitalized image data of subjects after the images are captured by the CCD 2, and is also used as a working memory for the DSP/CPU 3. When the shutter button is pressed in a still picture imaging, for example, image data of the still picture temporarily stored in the DRAM 9 is ultimately recorded on the memory card 12 as an image file in a predetermined format, such as JPEG, after various types of digital signal processings, including compression/decompression processings, are performed by the DSP/CPU 3.

The built-in flash memory 10 stores control programs required for the control of various parts by the DSP/CPU 3, such as programs required for various controls including AF (auto-focus control) or AE (auto-exposure control), as well as data required for various controls. The DSP/CPU 3 operates according to the programs to thereby function as a control module and a reproducing module in accordance with the present invention.

Figure 2:
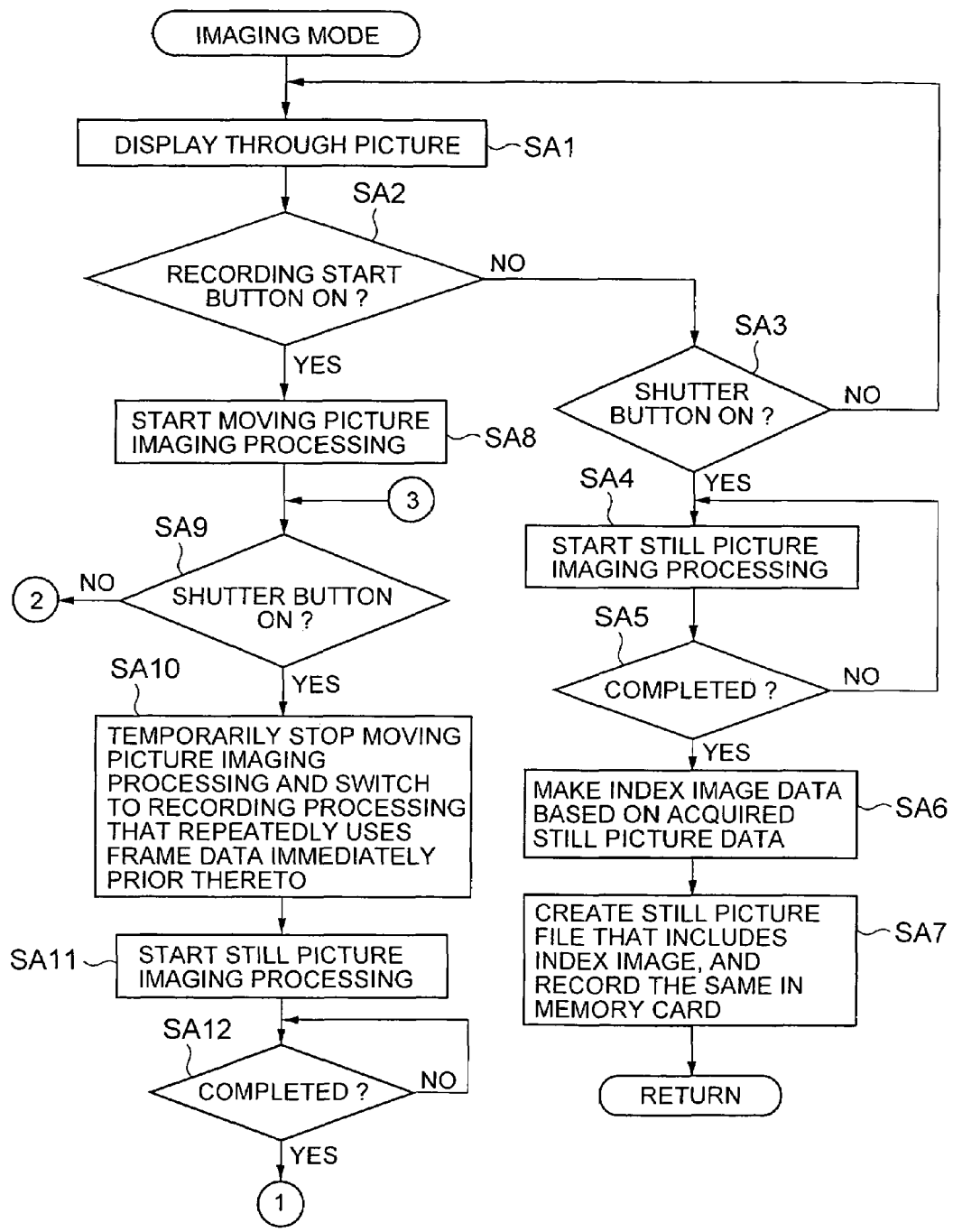
FIG. 2 shows a flowchart of the operation of the electronic still camera in an imaging mode.
Figure 3:
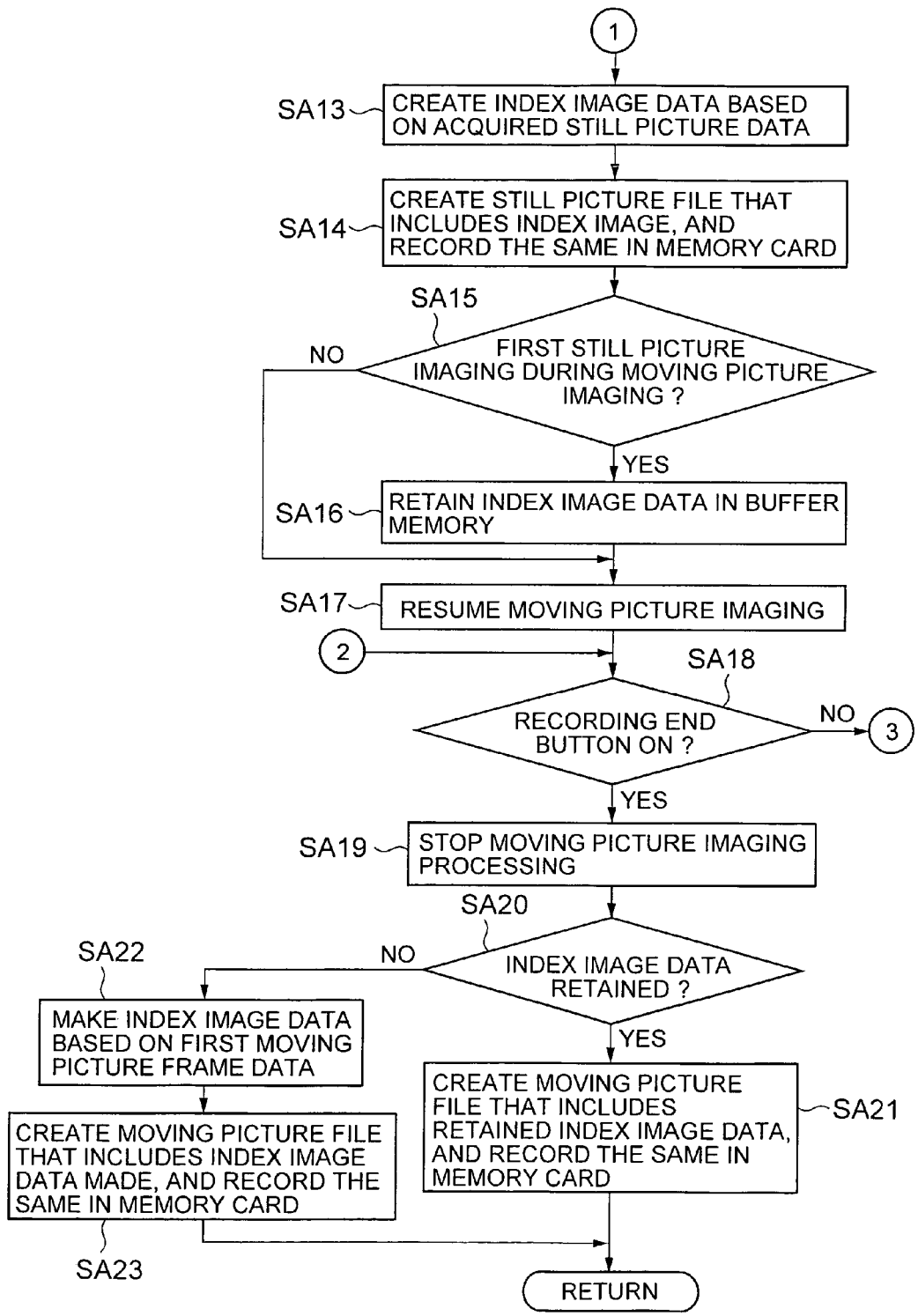
FIG. 3 shows a flowchart of the operation of the electronic still camera in the imaging mode continuing from FIG. 2.

Next, the operation of the electronic still camera 1 thus configured will be described. FIGS. 2 and 3 are a flowchart of the processing procedure of the DSP/CPU 3 when a user sets a predetermined imaging mode through an operation of the menu key.

When the imaging mode is set, the DSP/CPU 3 begins to capture images through the CCD 2 and displays through images of a subject on the display device 6 (step SA1); the DSP/CPU 3 repeats the through image display processing until the video-recording start button or the shutter button is operated (NO in both steps SA2 and SA3).

Figure 4A:
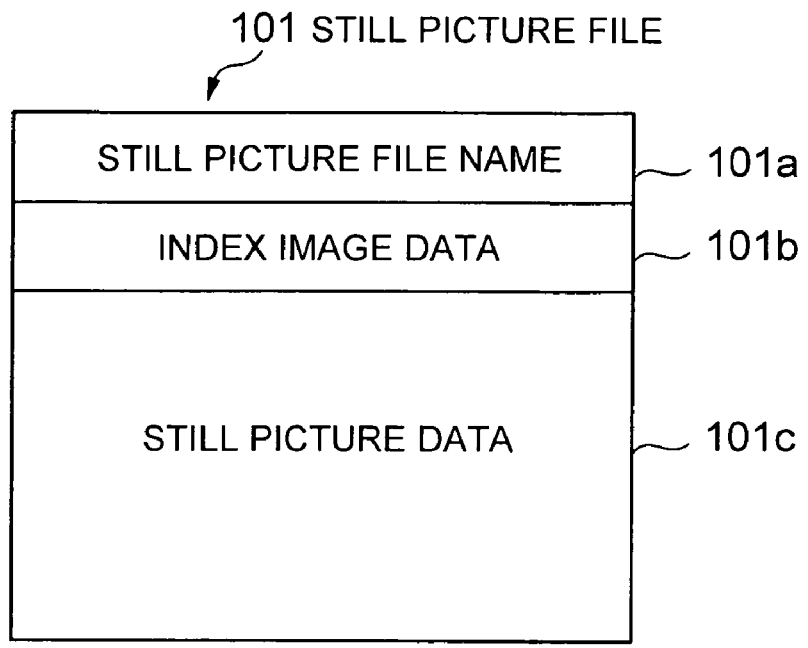
FIG. 4A schematically shows a data structure of a still picture file recorded in the imaging mode.

In the meantime, if the shutter button is pressed (NO in step SA2, YES in step SA3), the DSP/CPU 3 shifts into a normal still picture imaging mode and begins still picture imaging processing, such as setting imaging conditions through AF and AE operations and capturing with the CCD 2 a subject image for recording purposes (step SA4). Next, when the processing is completed (YES in step SA5), the DSP/CPU 3 creates data of an index image in the buffer memory (the DRAM 9) based on still picture data obtained (step SA6). The index image is an image that is displayed on the screen of the display device 6 in response to an operation to select a reproduction image in a reproduction mode (to be described below), or in response to an operation to check recorded images. The index image is a reduced image with a reduced number of pixels, which is generally called a thumbnail image. Then, the DSP/CPU 3 creates a still picture file in JPEG format, for example, that includes the index image created and records the still picture file on the memory card 12 (step SA7). FIG. 4A shows an example composition of a still picture file 101 that is recorded. The still picture file 101 is composed of a still picture file name 101a, index image data 101b, which is compressed data, and still picture data 101c. The DSP/CPU 3 then returns to step SA1 and displays through images.

When the video-recording start button is pressed while through images are being displayed (YES in step SA2), the DSP/CPU 3 shifts into a moving picture imaging mode and begins a moving picture imaging processing for capturing and storing images (moving picture frames) at a predetermined frame rate (a fixed cycle of 1/30 seconds, for example) (step SA8). To capture moving picture frames in the moving picture imaging processing, the DSP/CPU 3 causes the CCD 2 to output pixel signals of only the odd-numbered lines on one screen in a relatively short output timing, transfers pixel data of the odd-numbered lines into the buffer memory (the DRAM 9), and performs a processing to thin out the stored pixel data to the predetermined number of pixels. Subsequently, the DSP/CPU 3 continues the moving picture recording processing until the shutter button or the video-recording end button is pressed (NO in both steps SA9, SA18).

If the shutter button is pressed during the moving picture recording processing (YES in step SA9), the DSP/CPU 3 shifts into a still picture imaging mode (an imaging mode with a higher number of pixels than in moving picture imaging) through an interrupt processing and executes the processing up through step SA14 described below. First, the DSP/CPU 3 temporarily stops the normal moving picture recording processing when the shutter button is pressed and switches to a moving picture recording processing that repeatedly uses the immediately preceding frame image (step SA10). In other words, for the frame data that is to be accumulated in the buffer memory at a predetermined frame rate until a still picture imaging processing through an interrupt (to be described below) is performed, the DSP/CPU 3 switches from the normal moving picture recording processing that obtains frame data through capturing images to a moving picture recording processing that uses a copy of frame data accumulated immediately before the shutter button is pressed as a substitute frame. The DSP/CPU 3 performs a still picture imaging processing similar to the processing described in steps SA4-SA7, creates data of an index image in the buffer memory (the DRAM 9), creates a still picture file 101 composed of data shown in FIG. 4A, including the index image, and records the still picture file 101 on the memory card 12 (steps SA11-SA14). When the index image is created in step SA13, since the still image with a high number of pixels obtained through the still picture imaging processing is not required for the index image, the DSP/CPU 3 creates the index image by reducing the image size through such processing as thinning out pixels of the still image that was obtained through the still picture imaging processing.

Next, the DSP/CPU 3 determines whether the still picture imaging processing takes place for the first time since shifting to the still picture imaging mode through an interrupt processing (step SA15). This determination can be made by, for example, storing in a predetermined register that is reserved internally the number of times still picture imaging takes place after the DSP/CPU 3 shifts to the still picture imaging mode. If the result of the determination is YES, i.e., if the current still picture imaging is the first one, the DSP/CPU 3 reserves a predetermined region for an index image in the buffer memory, performs a processing to hold in the region the index image created in step SA13 (step SA16), returns to the normal moving picture imaging processing from the moving picture imaging processing it switched to in step SA10 (step SA17), and continues to image moving pictures. If the current still picture imaging is not the first one (NO in step SA15), the DSP/CPU 3 resumes the normal moving picture imaging processing (step SA17). This causes the index image in the buffer memory to be lost.

Subsequently, while the moving picture imaging processing continues (NO in step SA18), the DSP/CPU 3 records a new still picture file 101 on the memory card 12 through the processing in steps SA11-SA14 every time the shutter button is pressed. When the video-recording end button is eventually pressed (YES in step SA18), the DSP/CPU 3 stops the moving picture imaging processing (step SA19). Subsequently, if a still picture imaging through an interrupt has taken place during the moving picture imaging processing even once, and if any index image is retained in the predetermined region of the buffer memory (YES in step SA20), the DSP/CPU 3 creates a moving picture file in motion JPEG format, for example, that includes the index image retained, i.e., the index image identical to the one embedded in the still picture file recorded in step SA14, records the moving picture file on the memory card 12 (step SA21), and completes the first moving picture imaging processing.

Figure 4B:
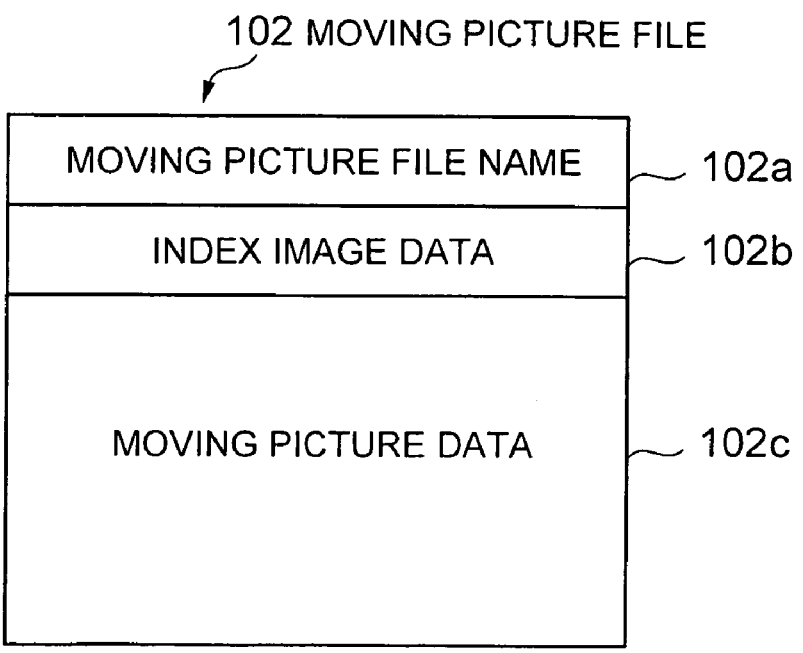
FIG. 4B schematically shows a data structure of a moving picture file recorded in the imaging mode.

FIG. 4B shows an example composition of a moving picture file 102 that is recorded, where the moving picture file 102 is composed of a moving picture file name 102*a*, index image data 102*b*, which is compressed data, and moving picture data 102*c*. The moving picture data 102*c* in this case is compressed data created by using a plurality of frame images that are stored and created from images actually captured at a predetermined frame rate, as well as a plurality of frame images that are stored and created from images captured immediately before each still picture imaging processing began.

If the result of determination in step SA20 is NO, i.e., if there was no still picture imaging through an interrupt during the moving picture imaging processing and no index image is held in the predetermined region of the buffer memory, the DSP/CPU 3 creates an index image based on the first of a plurality of frame images stored in the buffer memory (step SA22). Next, the DSP/CPU 3 creates the moving picture file 102 having the structure shown in FIG. 4B that includes the index image created, records the moving picture file 102 on the memory card 12 (step SA23), and completes the first moving picture imaging processing. The moving picture data 102*c* in this case is compressed data created by using only the frame images that are stored and created from images actually captured at a predetermined frame rate. Once the moving picture imaging processing completes, the DSP/CPU 3 returns to step SA1, displays through images, and repeats the processing described.

Figure 5:
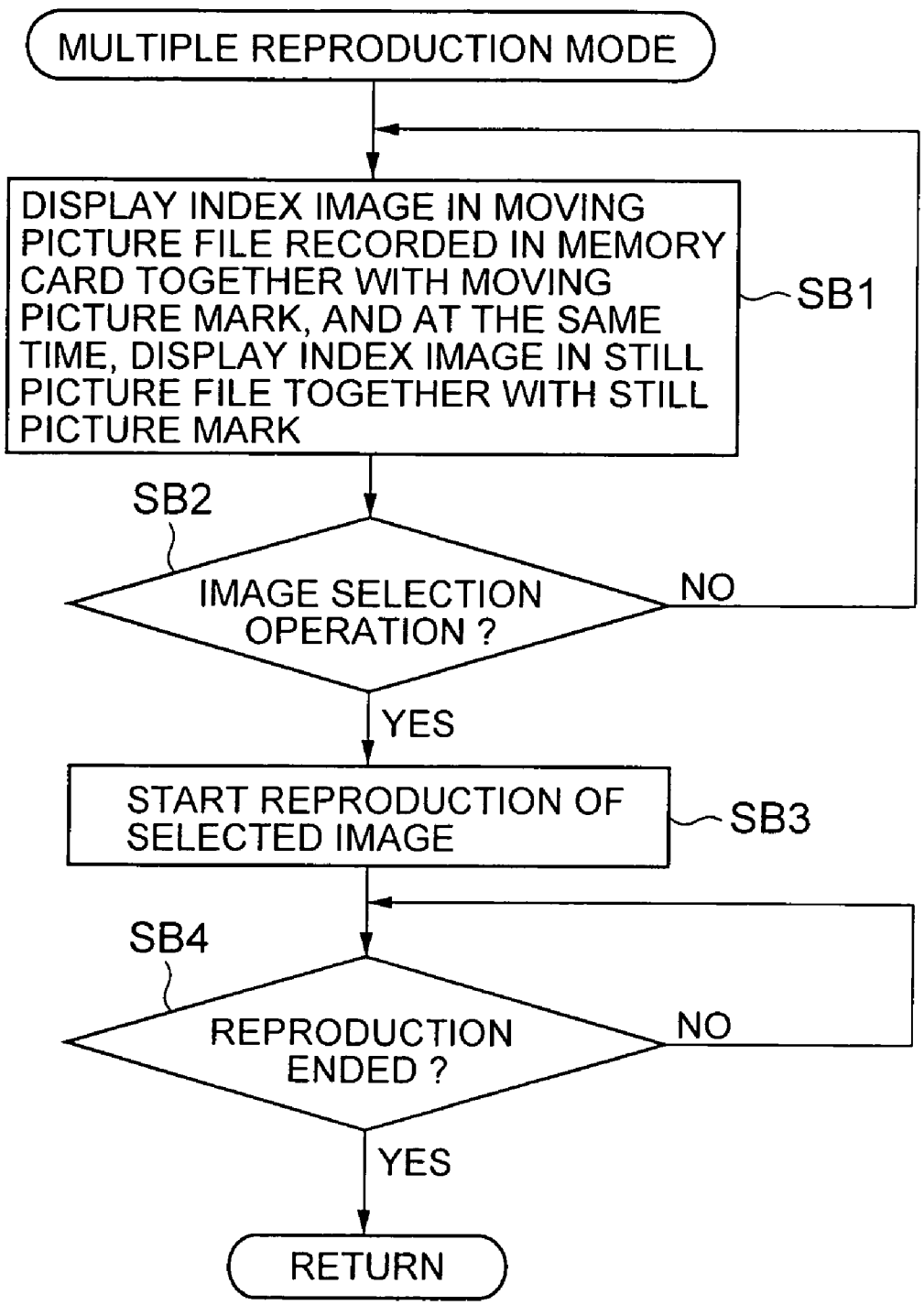
FIG. 5 shows a flowchart of the operation of the electronic still camera in a multi-reproduction mode.

FIG. 5 is a flowchart of the processing procedure executed by the DSP/CPU 3 when the user sets a predetermined multi-reproduction mode through an operation of the menu key.

When the multi-reproduction mode is set, the DSP/CPU 3 displays on the screen of the display device 6 a selection screen G (FIG. 6) to allow the user to select an image recorded on the memory card 12. In other words, the DSP/CPU 3 reads the index image data 102*b* from one or more moving picture files 102 recorded on the memory card 12, displays on the screen of the display device 6 the index images based on the index image data 102*b* along with predetermined moving picture marks, while also reading the index image data 101*b* from one or more still picture files 101 recorded on the memory card 12 and displaying on the screen of the display device 6 the index images based on the index image data 101*b* along with predetermined still image marks (step SB1). Through this, the DSP/CPU 3 allows the user to perform an operation to select a desired image.

Figure 6:
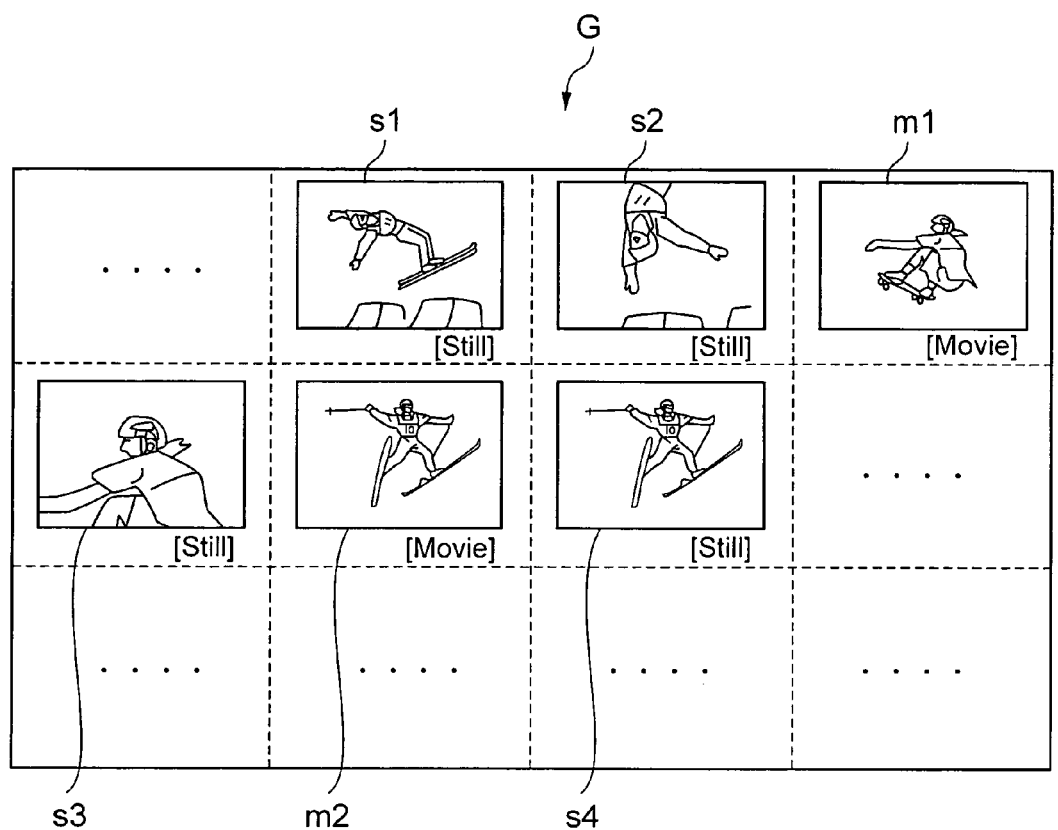
FIG. 6 shows a diagram of an example of a selection screen displayed by a display device when multi-reproduction mode is set.

FIG. 6 shows one example of the selection screen G on the display device 6; according to the present embodiment, moving picture index images m1, m2 . . . and still picture index images s1, s2 . . . are simultaneously displayed in an arrangement of 4 images horizontally×3 images vertically. "Movie" in FIG. 6 represents the movie mark, and "Still" represents the still mark; the index images are sorted from top left to bottom right in the order they were imaged (i.e., in the order they were recorded). In this example, the index image m2 is an index image of moving picture in which a still picture imaging through an interrupt processing took place during the moving picture imaging, the index image s4 is an index image of a still picture recorded through the still picture imaging, and the index images m2 and s4 are identical, as shown.

In this case, the index image m2 of the moving picture during which the still picture was coincidentally captured is the same image as the still picture that was captured coincidentally, i.e., the image of the scene for which the user's interest was higher than other scenes during the moving picture imaging. As a result, the index image m2 can cause the user to easily recall the content of the moving picture during which the still picture was coincidentally captured.

If the number of images (moving pictures and still pictures) recorded on the memory card 12 is more than can be shown on one screen, the DSP/CPU 3 displays the index images through scrolling in response to the user's moving of the cursor while the selection screen G is displayed. Once the user selects one of the images (YES in step SB2), the DSP/CPU 3 reads the file of the moving picture or still picture selected from the memory card 12, develops the corresponding moving picture data or still picture data in the buffer memory, and begins to reproduce a picture based on the data developed (step SB3). When the user performs an end operation (YES in step SB4), the DSP/CPU 3 ends the first reproduction processing, returns to step SB1, and allows the user to select an image again. In step SB4, instead of waiting for an end operation by the user, the DSP/CPU 3 can be designed to end the reproduction automatically after a predetermined amount of time has passed for still pictures, and when all moving picture frames have been displayed for moving pictures.

According to the present embodiment described above, a method for making a simultaneous imaging possible by temporarily stopping moving picture imaging when a still picture imaging is instructed during the moving picture imaging and by executing the still picture imaging processing (i.e., by performing an interrupt-imaging) has been described as a method for performing a still picture imaging during a movie picture imaging. However, methods for executing a still picture imaging processing parallel to a moving picture imaging processing, without stopping the moving picture imaging processing, can also be used. The method for executing a moving picture imaging processing and a still picture imaging processing parallel to each other can be realized, for example, by a camera that, when a still picture imaging is instructed during a moving picture imaging, extracts a frame image of the timing instructed from the moving picture and records it as a still picture to make a simultaneous imaging possible, and a camera having an imaging element for still picture imaging and an imaging element for moving picture imaging provided independently from each other to make a simultaneous imaging possible.

According to the present embodiment, an index image (m2) is created and the index image data 102b is embedded in the moving picture file 102 in a moving picture imaging. However, if a still picture imaging is executed during a moving picture imaging, the still picture obtained can be recorded as a head image and the head image of the moving picture can be reproduced as an index image (representative image) when index images of the moving picture are reproduced in the multi-reproduction mode. In this case, a reproduction program can be realized without any modifications, since index images of moving pictures are reproduced through a processing similar to conventional processing.

According to the present embodiment, index images are created during imaging and embedded in moving picture files. However, if a still picture imaging is executed during a moving picture imaging, the moving picture and the still picture obtained can be recorded in correlation to each other, so that the still picture (i.e., index image data or still picture data in a still picture file) that is recorded in correlation to the moving picture is read and reproduced as the index image of the moving picture when the index image of the moving picture is reproduced.

According to the present embodiment, index images are created during imaging and embedded in moving picture files. However, if a still picture imaging is executed during a moving picture imaging, flag information can be recorded in correlation to the moving picture frame of the still picture imaging timing in moving picture data, so that frame data of the moving picture frame recorded in correlation to the flag information can be extracted from the moving picture data and reproduced as the index image of the moving picture when the index image of the moving picture is reproduced. In this case, the flag information constitutes specifying information according to the present invention, and the memory card 12 functions as a specifying information recording means according to the present invention.

According to the present embodiment, index images are created during imaging and embedded in moving picture files. However, when a still picture imaging is executed during a moving picture imaging, information that can specify the timing of the still picture imaging in the moving picture (for example, the moving picture imaging start time and still picture imaging time, the time elapsed from the beginning of the moving picture imaging to the still picture imaging, the moving picture frame number of the timing of the still picture imaging, etc.) can be recorded as specifying information of the present invention in correlation to moving picture data, so that the frame data in the moving picture data specified by the information can be extracted and reproduced as the index image when the index image of the moving picture is reproduced.

According to the present embodiment, the present invention is applied to a situation in which index images of still picture files and index images of moving picture files are displayed together in a multi-reproduction mode. However, a multi-reproduction mode for displaying only still picture index images and a multi-reproduction mode for displaying only moving picture index images can be separately provided. In this case, there is no need to display the still picture index images and the moving picture index images distinguishably from each other.

According to the present embodiment, the present invention is applied to a multi-reproduction mode. However, the present invention can be applied to an individual reproduction mode, in which a still picture or moving picture index image is displayed by automatically or manually switching from one to another.

According to the present embodiment, an image captured at the timing of the first still picture imaging during a moving picture imaging is recorded as an index image. However, an image captured at the timing of a predetermined nth still picture imaging or an image captured at the timing of the last still picture imaging can be recorded as an index image.

According to the present embodiment, an image captured at the timing of the first still picture imaging during a moving picture imaging is recorded as an index image of the moving picture. However, if a plurality of still pictures are captured during a moving picture imaging, all of the plurality of still picture data obtained through the plurality of still picture imaging can be recorded as index images of the moving picture. Methods for recording all of the plurality of still picture data as index images of moving picture include a method for creating one multi-image data from the plurality of still picture data and recording the multi-image data as an index image of the moving picture, and a method for creating simplified moving picture data from the plurality of still picture data and recording the simplified moving picture data as an index image of the moving picture.

According to the present embodiment, moving picture data obtained through moving picture imaging and still picture data obtained through still picture imaging are recorded together on the same memory card. However, the moving picture data and the still picture data can be recorded on separate recording media. For example, the present invention can be applied to a situation in which, if a still picture imaging is instructed while moving picture data obtained through a moving picture imaging is being recorded on a magnetic tape, still picture data obtained through the still picture imaging may be recorded on a memory card.

According to the present embodiment, a still picture obtained through a still picture imaging during a moving picture imaging is used to create an index image of the moving picture and embedded in a moving picture file. However, frame data of the moving picture frame captured at the still picture imaging timing in the moving picture can be used to create an index image of the moving picture and embedded in a moving picture file.

According to the present embodiment, the present invention is applied to an electronic still camera with a moving picture imaging function, but the present invention is also applicable to a movie camera with a still picture imaging function, a portable telephone with camera, a PDA with camera, or a personal computer with camera. The present invention can be applied to any equipment having both the moving picture imaging function and still picture imaging function.

What is claimed is:

1. An imaging device comprising:
   an image capturing unit;
   a first imaging control unit that has the image capturing unit execute moving picture imaging;
   a movie picture file creation unit that creates a moving picture file based on moving picture data acquired through the moving picture imaging by the first imaging control unit;
   a first recording control unit that records in a memory the moving picture file created by the moving picture file creation unit;
   a recording instruction unit that instructs to record a still picture;
   a still picture acquisition unit that acquires, when recording of a still picture is instructed by the recording instruction unit while the first imaging control unit is executing moving picture imaging and the first recording control unit is recording the moving picture file in the memory, still picture data at the timing instructed;
   a still picture file creation unit that creates a still picture file based on the still picture data acquired by the still picture acquisition unit;
   a second recording control unit that records in a memory the still picture file created by the still picture file creation unit;
   a third recording control unit that records in the memory the still picture data acquired by the still picture acquisition unit as index picture data of the moving picture file recorded in the memory by the first recording control unit in addition to the still picture file created by the still picture file creation unit and recorded in the memory by the second recording control unit; and
   a judging unit that judges whether the recording instruction unit has given an instruction for still picture imaging during execution of the moving picture imaging by the first imaging control unit, wherein;
   the third recording control unit records in the memory head picture data of moving picture data in the moving picture file that is recorded in the memory by the first recording control unit as index picture data of the moving picture file, when the judging unit judges that still picture imaging has not been instructed.

2. An imaging device according to claim 1, further comprising a second imaging control unit that has the image capturing unit execute still picture imaging, wherein
   the recording instruction unit instructs still picture imaging and still picture recording,
   the second imaging control unit has the image capturing unit execute still picture imaging when the recording instruction unit instructs still picture imaging and still picture recording, and
   the still picture acquisition unit acquires still picture data obtained through still picture imaging by the second imaging control unit when the recording instruction unit instructs still picture imaging and still picture recording.

3. An imaging device according to claim 1, wherein, when the recording instruction unit instructs still picture recording, the still picture acquisition unit acquires still picture data at a timing of the instruction from among moving picture data obtained through the moving picture imaging by the first imaging control unit.

4. An imaging device according to claim 1, further comprising:
   a still picture imaging unit that captures still pictures, wherein the recording instruction unit instructs still picture imaging and still picture recording, and
   a third imaging control unit that has the still picture imaging unit execute still picture imaging when the recording instruction unit instructs still picture imaging and still picture recording, wherein the still picture acquisition unit acquires still picture data obtained through the still picture imaging by the third imaging control unit when the recording instruction unit instructs still picture imaging and still picture recording.

5. An imaging device according to claim 1, further comprising a size reduction unit that reduces a picture size of still picture data acquired by the still picture acquisition unit, wherein the third recording control unit records still picture data whose picture size is reduced by the size reduction unit in the memory as index picture data of the moving picture file.

6. An imaging device according to claim 1, wherein
   the third recording control unit records in the memory still picture data acquired by the still picture acquisition unit as accompanying data of the moving picture file that is recorded in the memory by the first recording control unit.

7. An imaging device according to claim 1, wherein the third recording control unit records in the memory still picture data acquired by the still picture acquisition unit as head picture data of the moving picture data in the moving picture file that is recorded in the memory by the first recording control unit.

8. An imaging device according to claim 1, further comprising an imaging instruction unit that instructs moving picture imaging, wherein
   the first imaging instruction unit has the image capturing unit execute moving picture imaging when the imaging instruction unit instructs the moving picture imaging.

9. An imaging device according to claim 8, wherein the third recording control unit records in the memory first still picture data acquired by the still picture acquisition unit after the imaging instruction unit instructs the moving picture imaging as index picture data of the moving picture file.

10. An imaging device according to claim 1, wherein, when the recording instruction unit instructs still picture imaging a plurality of times during execution of the moving picture imaging by the first imaging control unit, the still picture acquisition unit acquires a plurality of still picture data at timings of the instructions, the still picture file creation unit creates a plurality of still picture files based on the plurality of still picture data acquired by the still picture acquisition unit, the second recording control unit records in the memory the plurality of still picture files created by the still picture file creation unit, and the third recording control unit records in the memory the plurality of still picture data acquired by the still picture acquisition unit as index picture data of the moving picture files.

11. An imaging device according to claim 1, further comprising an index picture reproducing unit that reproduces still picture data that is recorded as index picture data in the memory by the third recording control unit.

12. An imaging device according to claim 11, wherein the index picture reproducing unit includes a unit that reproduces a plurality of still picture data recorded in the memory as index picture data by the third recording control unit, and further comprising a selection unit that selects desired still picture data from among the plurality of still picture data reproduced by the index picture reproducing unit, and a moving picture reproducing unit that reproduces a moving picture file corresponding to the still picture data selected by the selection unit.

* * * * *